United States Patent

Estlick

[15] 3,696,684

[45] Oct. 10, 1972

[54] MOTION CONVERTER ASSEMBLY

[72] Inventor: Raymond J. Estlick, Winchester, Mass.

[73] Assignee: Raytheon Company, Lexington, Mass.

[22] Filed: Dec. 21, 1970

[21] Appl. No.: 99,862

[52] U.S. Cl. ....................................74/104, 251/229
[51] Int. Cl. ..............................................F16h 21/44
[58] Field of Search ...74/104, 49, 102, 567; 251/229

[56] References Cited

UNITED STATES PATENTS

| | | | |
|---|---|---|---|
| 2,142,970 | 1/1939 | Anderson | 251/229 |
| 3,253,518 | 5/1966 | Duemler | 74/104 |
| 2,021,053 | 11/1935 | Englesbright et al. | 251/229 |
| 2,373,001 | 4/1945 | Allen | 251/229 |
| 2,820,372 | 1/1958 | Edge et al. | 74/104 |

FOREIGN PATENTS OR APPLICATIONS

| | | | |
|---|---|---|---|
| 73,965 | 3/1930 | Sweden | 74/104 |

*Primary Examiner*—William F. O'Dea
*Assistant Examiner*—Wesley S. Ratliff, Jr.
*Attorney*—Harold A. Murphy and Joseph D. Pannone

[57] ABSTRACT

A mechanism for converting the motion of a reciprocally movable member into a variable torque which produces limited angular motion of a rotatable member, said mechanism comprising a reciprocally movable rod carrying a radially extending pin which projects slidingly through a cam-shaped slot in a rigid support member and slidingly engages a moment arm having a portion thereof fixedly attached to a rotatable shaft.

19 Claims, 7 Drawing Figures

MOTION CONVERTER ASSEMBLY

BACKGROUND OF THE INVENTION

This invention relates, generally, to motion converter mechanisms and is concerned, more particularly, with a mechanism for converting reciprocal motion into a variable torque to produce limited rotary motion.

Various instances occur in the operation of mechanical equipment where reciprocally movable actuators produce limited angular motion of a rotatable shaft. Such an arrangement may be used for the operation of aircraft flaps, landing gear, missile fins, elevational assemblies, earth moving equipment, freight handling equipment and the like.

In one type of actuator, oil is forced into a cylinder to move a piston and attached rod linearly. The piston rod extends slidingly through an end wall of the cylinder and is connected to the rotatable shaft in such a manner that the resulting rectilinear movement of the rod is converted into limited angular movement of the shaft. The least expensive technique for accomplishing this objective is to provide a moment arm having one end fixedly attached to the shaft and the opposite end pivotally connected to the rod. This connection may be achieved by providing the piston rod with a transversely disposed pin which pivotally engages an aperture in the moment arm. Thus, as the piston rod moves reciprocally, the pin bears against the arm and moves it angularly thereby producing a torque which causes limited rotary motion of the shaft.

However, torque is the product of the effective length of the moment arm and the component of force applied normal thereto. Consequently, the described motion converter mechanism develops a torque which varies approximately with the cosine of the angle through which the moment arm is rotated. Thus, relatively high values of torque are applied to the rotatable shaft at minimum angles of rotation and relatively low values of torque are applied at maximum angles of limited rotation. In order to develop a specific value of torque at all angles of limited rotation, the described motion converter mechanism generally is designed to develop the required torque at the maximum angles of rotation and excessive torque at lesser values of rotation. As a result, the described motion converter mechanism operates inefficiently and expends energy unnecessarily. It would be more desirable and efficient to have a motion converter mechanism which delivers a controlled variable torque which matches the requirements of the load, delivering the minimum torque wherever it is sufficient and delivering the maximum torque wherever it is required during angular movement of the moment arm.

SUMMARY OF THE INVENTION

Accordingly, this invention provides a motion converter mechanism which converts the rectilinear motion of a reciprocally movable piston into limited angular motion of a rotatable shaft and provides means for varying the torque thus developed to conform with variable load requirements such that maximum torque may be provided at a particular angular position of the shaft, or during a preselected portion of angular movement. This invention comprises a reciprocally movable piston rod having a radially extending pin which projects slidably through a cam-shaped slot in a rigid support member and slidably engages an end portion of a moment arm. Thus, the cam-shaped slot positions the pin axially along the arm for each angular position of rotational movement and thereby determines the effective length of the moment arm throughout the operational cycle. Consequently, the cam slot is shaped to develop the desired values of torque for each linear position of the piston rod.

BRIEF DESCRIPTION OF THE DRAWING

For a better understanding of this invention, reference will be made to the accompanying drawing wherein.

DESCRIPTION OF THE PREFERRED EMBODIMENT

Figure 1:
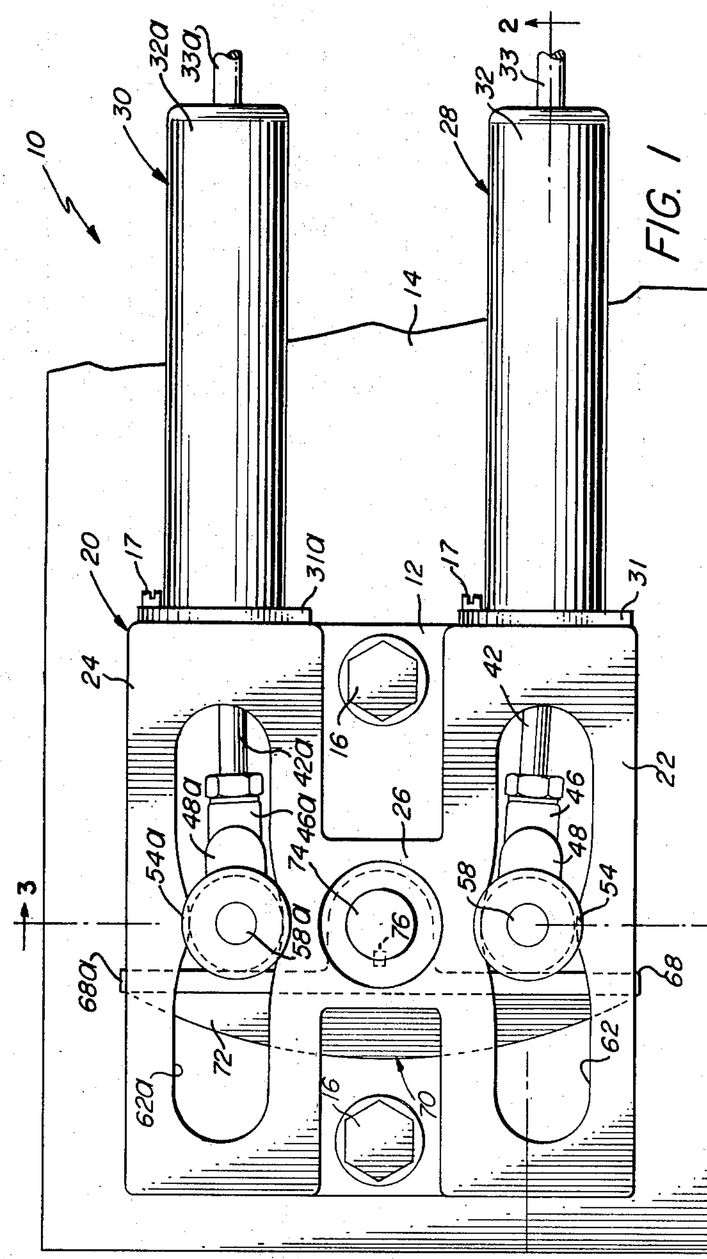
FIG. 1 is a top plan view of a motion converter assembly embodying the present invention.
Figure 2:
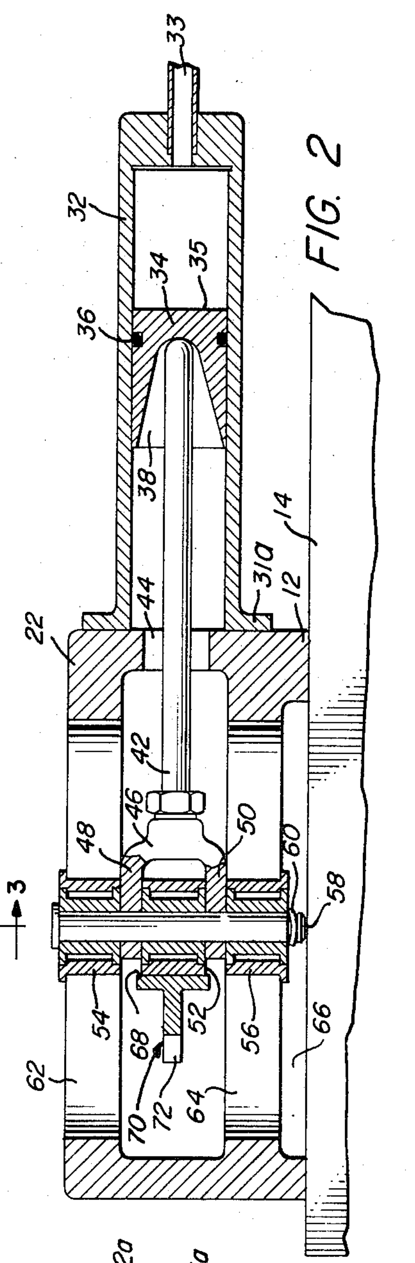
FIG. 2 is an axial view, partly in section, taken along line 2—2 shown in FIG. 1 and looking in the direction of the arrows.
Figure 3:
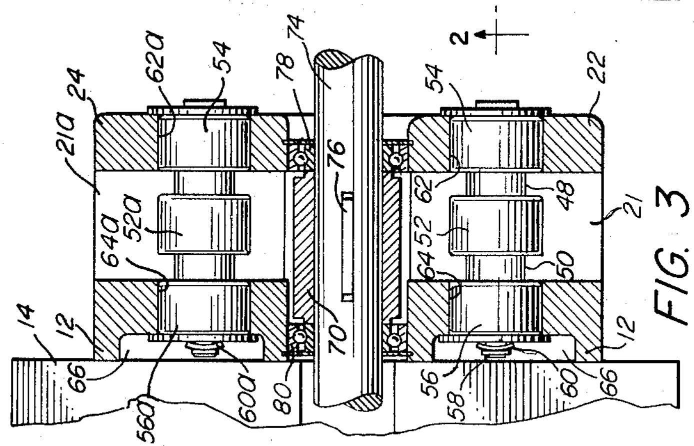
FIG. 3 is a fragmentary transverse view, partly in section, taken along line 3-3 shown in FIG. 1 and looking in the direction of the arrows.

Referring more particularly to the drawing wherein like characters of reference designate like parts throughout the several views, there is shown in FIGS. 1–3 a motion converter assembly 10 having a base plate 12 which is fastened to a supporting structure 14 by conventional means, such as bolts 16, for example. Assembly 10 comprises a generally H-shaped housing 20 including spaced parallel side portions, 22 and 24, respectively, and a transverse connecting portion 26. Each of the side portions, 22 and 24, is provided with a side opening, 21 and 21*a*, respectively, which extends transversely through the respective side portion of the housing. Adjacent end walls of the side portions 22 and 24 support aligned hydraulic actuators, 28 and 30, respectively.

In order to simplify this description, only the structural parts of one side portion of the housing and the aligned actuator will be set forth in detail. It is to be understood, therefore, that the other side portion of the housing and the aligned actuator are provided with equivalent structural parts which are designated by the same characters of reference followed by the subscript letter *a*.

Actuator 28 comprises a hollow cylinder 32 having an open flanged end 31 which is fixedly attached to the supporting wall of side portion 22 by conventional means, such as machine screws 17, for example. Attached to the opposite end of cylinder 32 is a fluid connecting member 33 which conducts hydraulic fluid to and from the cylinder 32. The cylindrical inner surface of cylinder 32 is slidingly engaged by a piston 34 which is encircled by a conventional 0-ring 36 for the purpose of sealing hydraulic fluid within the cylinder. Adjacent the O-ring 36, piston 34 is provided with a flat end surface 35 against which hydraulic fluid is forced during a power stroke of the piston and which forces fluid out of the cylinder 32 during a return stroke. The opposite end of a piston 34 is provided with a cavity 38 which tapers radially inward of the piston to form a spherical seat for a rounded end of a push rod 42, thereby providing means for achieving push rod motion and compensating for misalignment. Push rod 42 extends axially within the cylinder 32 and passes longitudinally through an oversized aperture 44 which is disposed in the supporting wall of aligned side portion 22.

Although the actuators 28 and 30 are described, in this embodiment, as being hydraulically driven, the motion converter mechanism of this invention would function equally as well with actuators which are driven by other means, such as pneumatic or electrical means, for examples.

Push rod 42 extends longitudinally out of actuator 28 and into the opening 21 of aligned side portion 22. Within the opening 21, the other end of push rod 42 is threadingly engaged by an axially aligned clevis 46 which provides means for adjusting the stroke of piston 34 within the cylinder 32. The clevis 46 is provided with parallel arms, 48 and 50, respectively, which are disposed in spaced parallel relationship with the upper and lower walls of side portion 22. Disposed between the parallel arms 48 and 50 is a center roller 52 having an axial center bore which is aligned with respective apertures in the arms 48 and 50. The clevis 46 is disposed between upper and lower rollers, 54 and 56, respectively, each of the rollers 54 and 56 having a respective axial center bore which is aligned with the axial center bore of roller 52. The aligned rollers 52–56 are slidingly engaged by a pin 58 which also passes through the respective apertures in parallel arms 48 and 50. Pin 58 is provided with a radially extending head on one end and is lockingly engaged adjacent the other end by a snap ring 60, whereby the upper and lower rollers, 54 and 56, respectively, are retained on the pin 58.

The upper wall of side portion 22 is provided with an axially extending slot 62 which is positioned in opposing spaced relationship with an identically shaped slot 64 disposed in the lower wall of side portion 22. Each of the slots 62 and 64 have arcuate portions which curve into closer spaced relationship with the transverse portion 26 of housing 20 than the remaining portions of the respective slots 62 and 64. Peripheral portions of slot 62 are slidingly engaged by the upper roller 54 while aligned peripheral portions of the slot 64 are slidingly engaged by the lower roller 56. Thus, when the reciprocally movable piston 34 acts through the engaged push rod 42 to produce rectilinear motion of the radially extending pin 58, the upper and lower rollers, 54 and 56, respectively, slide axially within the confining peripheries of respective slots 62 and 64. Since the rollers 54 and 56 are constrained to follow the contours of the respective slots 62 and 64, the pin 58 is carried radially inward toward the transverse portion 26 of housing 20 while the rollers 54 and 56 are passing axially through the arcuate portions of the respective slots 62 and 64. Thus, the slots 62 and 64 function as respective cams which control the radial movement of pin 58 during axial movement thereof by the reciprocally movable piston 34. The slots **62*a* and 64*a*, which are disposed in the upper and lower walls, respectively, of side portion 24, are mirror images of the slots 62 and 64, respectively. Therefore, the slots 62*a* and 64*a* also provide camming means, as described, for controlling radial movement of pin 58*a* during axial movement thereof by the aligned reciprocating means 30. To prevent interference of the supporting structure 14 with rectilinear motion of the respective pins 58 and 58a, the underside of base plate 12 is provided with axially extending recesses, 66 and 66*a*, respectively, which are disposed in parallel aligned relationship with the slots 64 and 64*a***, respectively.

Center rollers 52 and **52*a* bear laterally against respective track surfaces 68 and 68*a* which are provided on opposing end portions of a transversely disposed rocker arm 70. A central portion of rocker arm 70 surrounds a rotatable shaft 74 and is fixedly attached thereto by conventional means, such as key 76, for example. The longitudinal side of rocker arm 70 opposite the side having track surfaces 68 and 68*a*, respectively, is fixedly attached to a perpendicularly disposed, strengthening web 72 which is arcuately shaped to provide maximum strength adjacent the transverse center line of rocker arm 70. The shaft 74 is rotatably supported in the transverse portion 26 of housing 20 by means of upper and lower bearings, 78 and 80, respectively, which are mounted in the respective upper and lower walls of the transverse portion 26**.

Figure 3A:
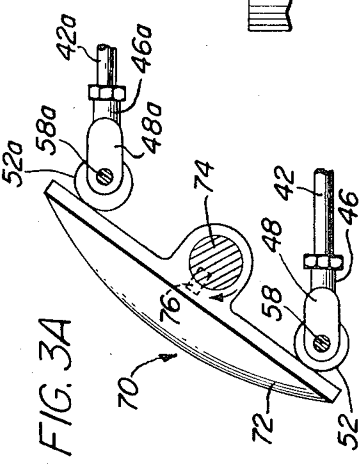
FIG. 3*a* is a plan view, partly in section, showing angular movement of the rocker arm and resulting limited rotational movement of the fixedly attached shaft shown in FIG. 1.

In operation, a control valve (not shown) directs the flow of oil into one of the hydraulic cylinders, such as 32, for example, and connects the other hydraulic cylinder, such as **32*a*, for example, to an exhaust port (not shown). The resulting linear displacement of piston 34 causes translational movement of piston rod 42 and radially extending pin 58 whereby center roller 52 bearing against track surface 68 produces angular motion of rocker arm 70 which results in limited rotational movement of shaft 74**, as shown in FIG. 3*a*. Thus, the linear portion of rocker arm 70, extending radially between the shaft 74 and the roller 52, functions as a moment arm which converts the rectilinear motion of piston 34 into a torque for rotating the shaft 74. The angular motion of rocker arm 70 also causes the track surface **68*a* bearing against the center roller 52*a* to produce translatory motion of the pin 58*a* and the piston rod 42*a* which results in hydraulic fluid being forced out of the cylinder 32*a* by way of the fluid conducting member 33*a***.

The translatory motion of piston rod 42 and radially extending pin 58 also causes the upper and lower rollers, 54 and 56, respectively, to slide axially along the respective cam slots 62 and 64. While passing through the arcuate portions of the respective slots 62 and 64, the respective rollers 54 and 56 carry the pin 58 and the center roller 52 toward and then away from the transverse portion 26 of housing 20. As a result, the center roller 52 slides radially inward and outward along the track surface 68, relative to the rotatable shaft 74, thereby decreasing and then increasing the effective length of the moment arm portion of rocker arm 70. Since torque is proportional to the effective length of the moment arm, the torque, thus produced, decreases as the roller 52 approaches the shaft 74 and increases as the roller 52 slides away from the shaft 74 along the track surface 68. Thus, the respective cam slots 62 and 64 provide means for varying the torque in accordance with the requirements of the load. When oil is directed into cylinder **32*a* and the cylinder 32 is connected to an exhaust port (not shown), the rocker arm 70** is rotated in the opposite angular direction from that shown in FIG. 3*a*, by the center roller **52*a* bearing against the track surface 68*a*. The torque, thus produced, is varied in a similar manner, by the upper and lower rollers, 54*a* and 56*a*, respectively, sliding axially along the respective slots 62*a* and 64*a*. Thus, the respective cam slots 62*a* and 64*a*** also provide means for varying the torque in accordance with the requirements of the load.

Figure 4:
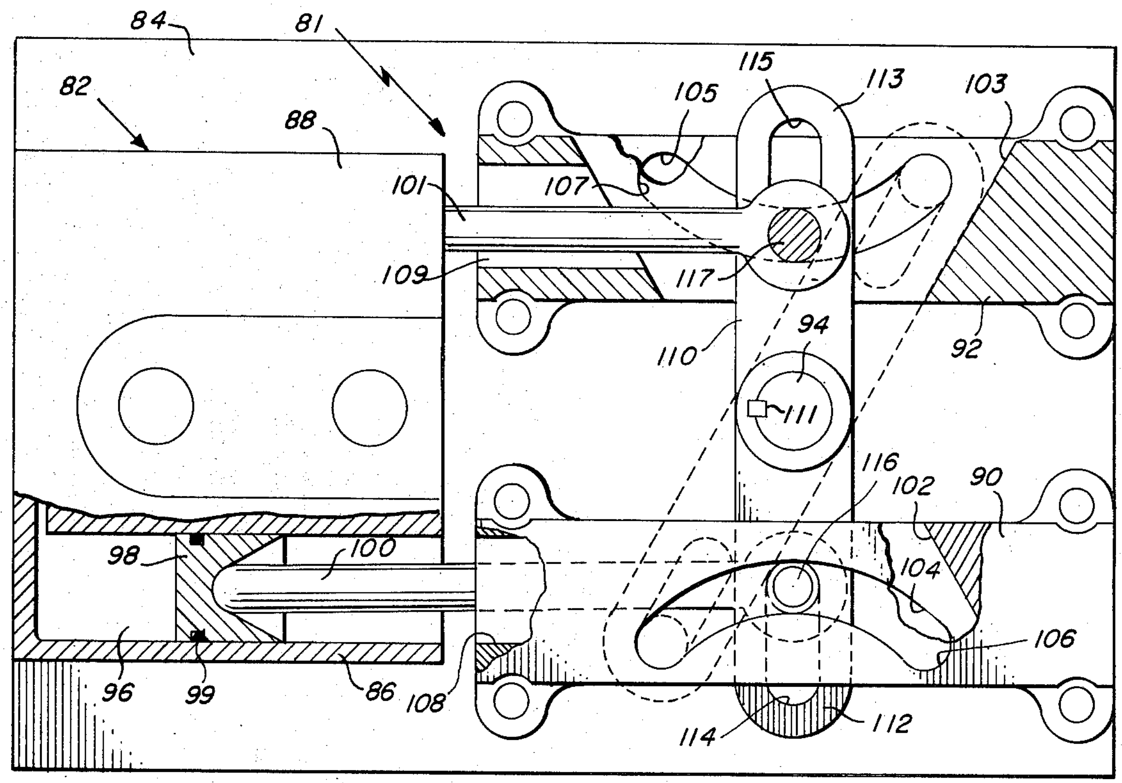
FIG. 4 is an alternative embodiment of the invention.

FIG. 4 shows a simplified alternative embodiment 81 comprising an actuator assembly 82 which is fastened to a base member 84 by conventional means and is provided with spaced parallel side portions 86 and 88, respectively. The side portions 86 and 88 are disposed in axial spaced relationship with respective elongated housings 90 and 92 which also are fastened to base member 84 by conventional means. The respective housings 90 and 92 are positioned equidistant from a rotatably shaft 94 which extends perpendicularly from a portion of the base member 84 disposed between the housings 90 and 92, respectively.

Side portion 88 of actuator assembly 82 is structurally similar to the side portion 86 which is provided with an axially extending cavity 96 having an open end disposed adjacent the housing 90 and a cylindrical inner surface which is slidingly engaged by a piston 98 encircled by a conventional 0-ring 99. Piston 98 is disposed in abutting relationship with one end of a push rod 100 which extends longitudinally out of the open end of cavity 96 and into the axially aligned housing 90. Similarly, a push rod 101 extends longitudinally out of side portion 88 and into the axially aligned housing 92.

Housing 90 is structurally similar to housing 92 which has a truncated, V-shaped slot 103 transversely disposed therein, the slot 103 having a smaller rectangular opening in the side of housing 92 adjacent the shaft 94 than in the opposing side of the housing. The wall of housing 92 overlaying the transverse slot 103 is provided with an arcuate cam slot 105 having an apex portion disposed in closer spaced relationship with the shaft 94 than the remaining portions of slot 105. Cam slot 105 is positioned in opposing spaced relationship with an identically shaped cam slot 107 which is disposed in the wall of housing 92 underlaying the slot 103. Extending axially between the transverse slot 103 and the end of housing 92 disposed adjacent side portion 88 is a centrally located bore 109 having a diameter which is considerably greater than the diameter of push rod 101.

The truncated, V-shaped slot 103 is a mirror image of a similarly shaped slot 102 which is transversely disposed in housing 90 and has a smaller rectangular opening in the side of housing 90 disposed adjacent the shaft 94 than in the opposing side of the housing. Similarly, the respective cam slots 105 and 107 are mirror images of respective cam slots 104 and 106 disposed in the walls of housing 90 overlaying and underlaying, respectively, the transverse slot 102. Also, the housing 90 is provided with a centrally located bore 108 which extends axially between the transverse slot 102 and the end of housing 90 disposed adjacent the side portion 86, similar to the bore 109 axially disposed in housing 92.

A rocker arm 110 having a central portion which surrounds the shaft 94 is fixedly attached thereto by conventional means, as by key 111, for example, and has opposing end portions 112 and 113 which extend transversely through respective slots 102 and 103 in housings 90 and 92, respectively. End portion 112 of arm 110 is provided with an axially extending slot 114 which is transversely disposed relative to cam slots 104 and 106, respectively. Similarly, end portion 113 has an axially extending slot 115 which is transversely disposed relative to cam slots 105 and 107, respectively. Push rod 100 extends longitudinally through oversized bore 108 and into slot 102 where the inner end of rod 100 carries a radially extending pin 116. Pin 116 is passed slidably through slit 114 and has opposing end portions which project slidably through cam slots 104 and 106 in housing 90. Similarly, push rod 101 extends longitudinally through oversized bore 109 and into slot 103 where the inner end of rod 101 carries a radially extending pin 117. Pin 117 is passed slidably through slot 115 and has opposing end portions which project slidably through cam slots 105 and 107.

The embodiment 81 shown in FIG. 4 operates in substantially the same manner as the embodiment shown in FIGS. 1–3, alternate opposing translatory movement being imparted to respective push rods 100 and 101 by the aligned actuators 86 and 88, respectively. As a result, the respective pins 116 and 117 slide axially along associated cam slots 102, 104 and 105, 107, respectively, bearing against peripheral portions of the respective slots 114 and 115 and thereby producing alternately opposing angular movements of rocker arm 110 which, in turn, cause limited rotary motion of shaft 94. Simultaneously, however, the respective pins 116 and 117 are forced to follow the arcuate contours of the associated cam slots 102, 104 and 105, 107, respectively. As a result, the respective pins 116 and 117 are carried radially along the associated longitudinal slots 114 and 115 into closer spaced relationship with the shaft 94 when passing through the respective apex portions of the cam slots and more distant spaced relation with the shaft 94 when sliding toward the extreme ends of the respective cam slots. Thus, the torque developed when the respective pins pass through the arcuate portions of the associated cam slots is a minimum value and corresponds with the midpositions of the piston strokes in associated actuators 86 and 88, respectively. On the other hand, when the pistons reach the extreme limits of linear travel, the respective pins reach the extreme limits of arcuate travel and maximum torque is produced. Consequently, if the pistons are normally maintained at midposition, the respective pins initially will be positioned in the apex portions of the associated cam slots and minimum torque will be produced for small angular movements of the rocker arm.

Conventional motion converter mechanisms similar to the type described herein usually produce a torque which varies approximately with the cosine of the angle through which the moment arm is rotated. Consequently, conventional systems generally deliver maximum torque at minimum angles of rotation, and minimum torque for maximum angles of rotation, with respect to a midangular null position. As a result, conventional systems, usually, are designed to produce a specific torque at the extreme limits of angular movement. Thus, excessive torque is developed for minimum angles of rotation on either side of the null position. Accordingly, when these conventional systems are used with loads, such as missile fins, for example, which generally require only small corrective angular movements around a midangular null position during flight, power is dissipated unnecessarily in producing the excessive torques for achieving these small angular movements. Thus, the motion converter mechanism of this invention offers an advantage over similar motion converter mechanisms of the prior art because of the minimum torque developed by this converter for small angular movements around a null position and the maximum torque developed for extreme angular movements.

Figure 6:
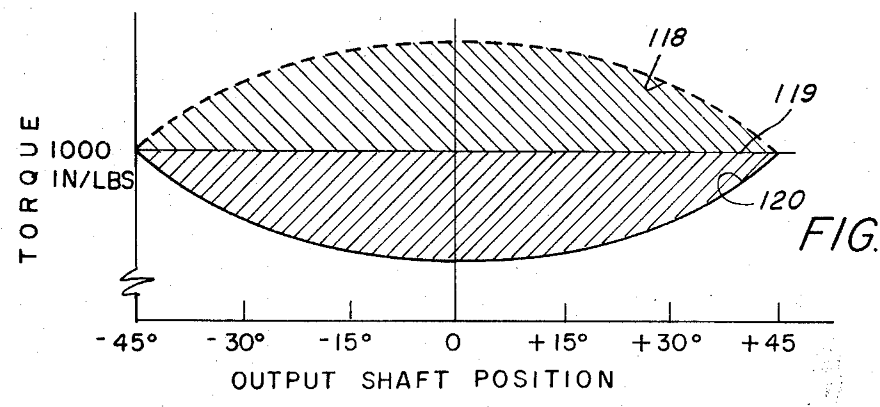
FIG. 6 is a diagrammatic illustration of the improved torque output obtained when practicing this invention.

In FIG. 6, torque output is plotted against typical angular displacements of a rotatable shaft, either side of a null position, for a conventional motion converter mechanism, curve 118, a constant output motion converter mechanism, curve 119, and the motion converter mechanism of this invention, as shown in FIG. 4, curve 120. From this graph, it can be readily seen that for small angular displacements either side of the null position, the torque values on curve 120 are minimal whereas the torque values on curve 118 are maximal. On the other hand, for extreme angular displacements, the torque values on curve 120 are maximal whereas the values on curve 118 are minimal.

However, the cam slots 104–107 need not have the arcuate shapes shown in FIG. 4. As shown in FIG. 1, the cam slots 62, 62*a*, 64 and 64*a* are shaped to produce torque outputs which are a minimum for small angular displacements either side of a null position, increase to a maximum value at an intermediate angular position and remain constant out to the extreme angular positions either side of the null position. Further, the apex portion of the cam slot need not be located at the null position but may be disposed either side thereof to deliver a minimum value of torque wherever sufficient to handle the load. Moreover, the maximum value of torque need not occur at the extreme angular positions but may be produced by the cam slot wherever required by the load. Thus, within the limits of smooth camming operation, the cam slot of this invention may be shaped to produce a torque output which increases or decreases in accordance with the requirements of a varying load.

Figure 5:
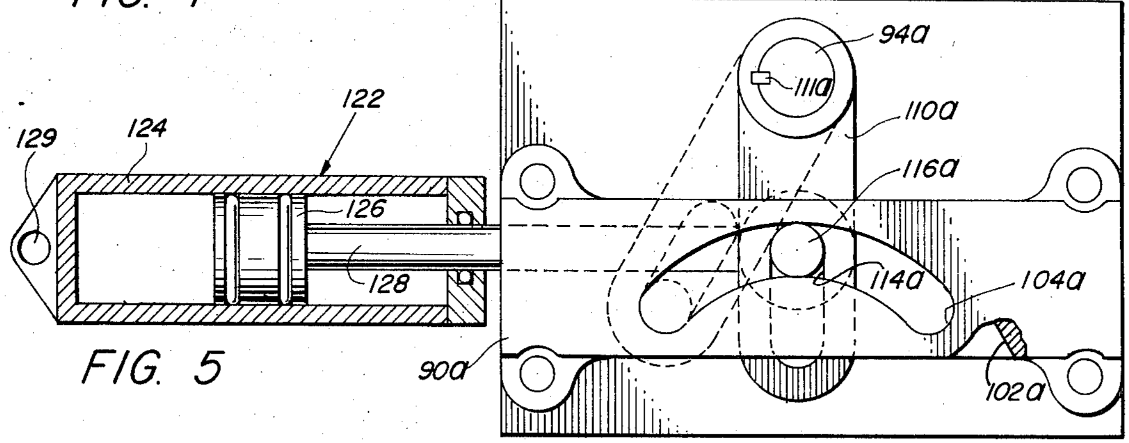
FIG. 5 is another embodiment of the invention.

FIG. 5 shows a third embodiment of this invention comprising a push-pull type actuator 122 having an aperture 129 disposed in an end portion thereof whereby the actuator is pivotally secured to a support member (not shown). Actuator 122 includes a hollow cylinder 124 having an inner surface slidably engaged by a reciprocally movable piston 126 which is fixedly attached to one end of a piston rod 128. The rod 128 extends longitudinally out of a sealed aperture in one end of cylinder 122 and into a housing 90*a* which is similar in construction to the housing 90 shown in FIG. 4. The housing 90*a* may be provided with a single cam slot 104*a* or may have a pair of opposing cam slots 104*a* and 106*a*, respectively, having identical shapes as shown in FIG. 4. A rocker arm 110a having an end portion surrounding a rotatable shaft 94*a* and fixedly attached thereto, as by a key 111*a*, has an opposing end portion provided with an axially extending slot 114*a* which extends transversely through slot 102*a* in housing 90*a*.

In operation, both power strokes are supplied by the actuator 122 thereby moving the rod 128 alternately in opposing linear directions and moving a radially extending pin 116*a*, carried on the other end of the rod, in oscillatory motion along the associated cam slot 104*a* or 104*a* and 106*a*, as the case may be. As a result, the pin 116*a* bears against peripheral portions of the slot 114*a* in rocker arm 110*a* thereby alternately rotating the arm in opposing angular directions and producing limited rotary movement of shaft 94*a*. Simultaneously, the pin 116*a* is forced to follow the contour of cam slot 104*a* and, consequently, travels radially inward and outward along the slot 114*a* relative to the shaft 94*a*. Thus, the moment arm portion of rocker arm 110*a* varies correspondingly and results in a variable torque being produced. The torque, thus developed, has a minimum value at some intermediate angular position between two extreme angular positions.

Thus, there has been disclosed herein a motion converter mechanism for developing a variable torque which matches the variable requirements of a load. The motion converter mechanism of this invention comprises a reciprocally movable rod carrying a radially extending pin which projects slidably through a cam slot in a fixed support member and, on the far side thereof, slidably engages an end portion of a rotatable arm. The cam slot is provided with an arcuate portion having a crest disposed in closer spaced relationship with the pivotal portion of the shaft than the remaining portion of the cam slot whereby the pin is moved along the arm into closer spaced relationship with the pivotal portion of the shaft. Thus, a shorter moment arm is produced for developing a minimum torque which matches minimum requirements of a load fixedly attached to the rotatable shaft.

From the foregoing, it will be apparent that all of the objectives of this invention have been achieved by the structures shown and described herein. It will be also apparent, however, that various changes may be made by those skilled in the art without departing from the spirit of the invention as expressed in the appended claims. It is to be understood, therefore, all matter shown and described herein is to be interpreted as illustrative and not in a limiting sense.

What is claimed is:

1. A motion converter assembly comprising:

a pivotal member having a rotatably supported portion and an angularly movable end portion;

a fixed rigid member adjacent said end portion and having an arcuate slot therein, the slot being transverse to said end portion and having an apex located closer to said rotatably supported portion than the remainder thereof;

an elongated member in abutting engagement with said end portion and slidable linearly in said slot; and means for moving said elongated member translationally in the direction of said end portion and thus developing a variable torque.

2. A motion converter assembly as set forth in claim 1 wherein the slot includes linearly extended portions.

3. A motion converter assembly comprising:
a shaft rotatable about its longitudinal axis;
an arm member fixed to the shaft and rotatable therewith in a plane perpendicular to the axis of the shaft;
a fixed rigid member adjacent the arm member and having therein an arcuate slot the apex of which lies closer to said axis than the remainder thereof;
a movable member in engagement with the arm member at one side of the shaft and slidable linearly within the slot; and
means connected to the movable member for moving the movable member in the direction of the arm member and for consequently developing a variable torque for rotating the shaft.

4. A motion converter assembly as set forth in claim 3 wherein said means includes a translationally movable, elongated member adjacent and parallel with the slot; and the movable member comprises a pin extending from the elongated member, the pin being in abutting engagement with the arm member and slidable linearly in the slot.

5. A motion converter assembly as set forth in claim 4 wherein a rotatable sleeve encircles said pin.

6. A motion converter assembly as set forth in claim 4 wherein said elongated member comprises a pivotally supported rod.

7. A motion converter assembly as set forth in claim 4 wherein said means further includes a piston pivotally connected to said elongated member.

8. A motion converter assembly as set forth in claim 7 wherein said means also includes a hollow cylinder and said piston being slidable therein.

9. A motion converter assembly comprising:
a shaft rotatable about its longitudinal axis;
an arm member fixed to the shaft and rotatable therewith in a plane perpendicular to said axis, the arm member having a longitudinally extending surface transverse to said plane;
a fixed rigid member located adjacent the arm member and having an arcuate slot adjacent and parallel with said plane, the slot having an apex located closer to the shaft than the remainder thereof;
an elongated member adjacent and parallel with the slot;
a pin supported by the elongated member, transverse thereto and extending radially therefrom, said pin having a transverse portion slidable linearly within the slot and a peripheral portion in abutting slidable engagement with said longitudinally extending surface; and
means connected to the elongated member for sliding the transverse portion along the slot in the direction of the arm member and for consequently sliding the peripheral portion along the longitudinally extending surface while rotating the arm member, and thus developing a variable torque for rotating the shaft.

10. A motion converter assembly as set forth in claim 9 wherein said rigid member comprises a wall parallel with said plane, said elongated member being in said plane, and said longitudinally extending surface comprises a side surface of the arm member.

11. A motion converter assembly as set forth in claim 10 wherein said arcuate slot is a through slot and said transverse portion of the pin extends through the rigid wall.

12. A motion converter assembly as set forth in claim 9 wherein said rigid member comprises a wall parallel with said plane on one side of said arm member and said elongated member is parallel with said plane on the opposite side of the arm member.

13. A motion converter assembly as set forth in claim 12 wherein the arm member has a longitudinally extending slot therein and said peripheral portion of the pin is in slidable engagement with a longitudinal side of the slot.

14. A motion converter assembly comprising:
a shaft rotatable about its longitudinal axis;
an arm member fixed to the shaft and rotatable therewith in a plane perpendicular to said axis;
a fixed rigid member adjacent the shaft and having two spaced walls parallel with said plane and spaced from respective opposing surfaces of the arm member, the walls having therein respective arcuate slots transverse to the arm member and aligned with one another, each slot having a respective apex located closer to the shaft than the remainder of the associated slot;
an elongated member between the walls, in alignment with the slots and transverse to the arm member;
a pin transversely supported in the elongated member and extending radially therefrom, said pin having opposing end portions slidable linearly in a respective slot and a peripheral portion in abutting engagement with the arm member; and
means connected to the elongated member for moving said elongated member translationally in the direction of the arm member and consequently developing a variable torque for rotating the shaft.

15. A motion converter assembly as set forth in claim 14 wherein said arm member has a longitudinally extending slot therein and said peripheral portion of the pin is slidable linearly in the slot and in abutting engagement with a longitudinal side of the slot.

16. A motion converter assembly as set forth in claim 15 wherein said elongated member is a rod and said means includes a piston reciprocally slidable in a hollow cylinder and pivotally connected to the rod.

17. A motion converter assembly comprising:
a pair of elongated hollow housings having spaced opposing longitudinal sides and having respective openings in said sides opposite one another;
said side of each housing having respective opposing longitudinal edges attached to upper and lower walls of the housing, each upper wall having an axially extended through slot therein and aligned in opposing relationship with a similar through slot in the associated lower wall, each of said slots including an arcuate portion having an apex adjacent said longitudinal side of the respective housing;
a shaft longitudinally extended in a perpendicular plane between the housings and spaced therefrom, said shaft being rotatable about its longitudinal axis;
a rocker arm having a central portion fixedly attached to the shaft and opposing end portions within respective aligned openings in said longitudinal sides of the housings;

two reciprocating actuators adjacent transversely aligned end portions of the housings, each actuator being axially aligned with a respective housing;

two reciprocally movable rods, each rod being pivotally supported in a respective actuator extending axially therefrom into said aligned housing and having a terminal end portion axially extended within the interior of said aligned housing; and two pins, each pin being transversely supported in the terminal end portion of a respective rod and having opposite end portions slidable linearly in respective slots in the upper and lower walls of the respective housing, each pin also having a portion thereof slidable against a surface of said respective end portion of the rocker arm.

18. A motion converter assembly as set forth in claim 17 wherein said end portion surfaces comprise respective side surfaces of said end portions.

19. A motion converter assembly as set forth in claim 17 wherein said end portions of the rocker have respective longitudinal slots therein and said pins are slidable linearly within respective longitudinal slots, each pin having a peripheral portion thereof in abutting engagement with a longitudinally extending side surface of the associated slot.

* * * * *